(12) United States Patent
Park et al.

(10) Patent No.: US 11,337,184 B2
(45) Date of Patent: May 17, 2022

(54) METHOD AND APPARATUS FOR TRANSMITTING AND RECEIVING DATA STREAM PERFORMED IN VEHICLE NETWORK

(71) Applicants: Hyundai Motor Company, Seoul (KR); Kia Motors Corporation, Seoul (KR); Industry-University Cooperation Foundation Hanyang University, Seoul (KR)

(72) Inventors: Sung Kwon Park, Seoul (KR); Ju Ho Lee, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 120 days.

(21) Appl. No.: 16/857,975

(22) Filed: Apr. 24, 2020

(65) Prior Publication Data

US 2020/0344740 A1     Oct. 29, 2020

(30) Foreign Application Priority Data

Apr. 25, 2019 (KR) .................... 10-2019-0048497
Apr. 7, 2020 (KR) .................... 10-2020-0042338

(51) Int. Cl.
| | |
|---|---|
| *H04W 72/04* | (2009.01) |
| *G08G 1/01* | (2006.01) |
| *H04L 65/613* | (2022.01) |
| *H04W 4/40* | (2018.01) |

(52) U.S. Cl.
CPC ...... *H04W 72/0406* (2013.01); *G08G 1/0125* (2013.01); *H04L 65/4092* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2009/0003384 A1* | 1/2009 | Rozental | H04L 47/34 370/485 |
| 2012/0176894 A1* | 7/2012 | Cai | H04L 47/20 370/230 |
| 2014/0022938 A1* | 1/2014 | Olsen | H04L 65/80 370/254 |
| 2019/0253339 A1* | 8/2019 | Mehmedagic | H04L 45/3065 |

(Continued)

FOREIGN PATENT DOCUMENTS

WO   WO-2020035130 A1 *  2/2020  ......... H04L 12/1407

*Primary Examiner* — Rebecca E Song
(74) *Attorney, Agent, or Firm* — Mintz Levin Cohn Ferris Glovsky and Popeo, P.C.; Peter F. Corless

(57) ABSTRACT

An operation method of a management node in a vehicle network is provided. The method includes receiving a reservation request for transmission of a data stream from a first communication node and identifying a bandwidth required for transmitting the data stream. A path for transmitting the data stream is calculated based on the identified bandwidth and time sensitive networking (TSN) profile information. Configuration modes of one or more relay nodes in the path are changed and a response to the reservation request is transmitted to the first communication node.

17 Claims, 14 Drawing Sheets

(56) References Cited

U.S. PATENT DOCUMENTS

2020/0145293 A1* 5/2020 Terazawa ................ H04L 12/46
2020/0244591 A1* 7/2020 Meng ...................... H04L 47/72
2021/0112001 A1* 4/2021 Li .......................... H04W 76/12

* cited by examiner

FIG. 10

| stream identifier (ID) 1001 | MAC address 1002 | interface 1003 | reserved bandwidth 1004 | accumulated bandwidth ratio 1005 |
|---|---|---|---|---|
| 1 | 1 | PHY[0]→PHY[1] | 30Mbps | 30% |
| 1 | 2 | PHY[3]→PHY[4] | 30Mbps | 30% |
| ... | | | | |
| 1 | 6 | PHY[5]→PHY[6] | 30Mbps | 60% |
| 3 | 1 | PHY[0]→PHY[2] | 30Mbps | 30% |
| ... | | | | |

METHOD AND APPARATUS FOR TRANSMITTING AND RECEIVING DATA STREAM PERFORMED IN VEHICLE NETWORK

CROSS-REFERENCE TO RELATED APPLICATION

This application claims the benefit of priority to Korean Patent Applications No. 10-2019-0048497 filed on Apr. 25, 2019, and No. 10-2020-0042338, filed on Apr. 7, 2020 with the Korean Intellectual Property Office (KIPO), the entirety of which is incorporated by reference as if fully set forth herein.

TECHNICAL FIELD

The present disclosure relates to a technology for communications in a vehicle network, and more specifically, to a method and an apparatus for transmitting and receiving a data stream in a vehicle network.

BACKGROUND

The number and variety of devices installed within vehicles have increased significantly in accordance with the recent digitalization of vehicle parts. Generally, electronic devices may be used throughout the vehicles, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Most enhanced safety systems of a vehicle, such as telematics systems and infotainment systems, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks may be costly. Due to these limitations, an Ethernet-based network is often utilized as a vehicle network. The Ethernet-based network may support bi-directional communication through one pair of windings and may support a transmission rate of up to 10 Gbps. Meanwhile, a method for improving Quality of Service (QoS) by efficiently reserving and managing a data stream in sections having different link speeds is being studied.

SUMMARY

The present disclosure provides a method and an apparatus for transmitting and receiving a data stream using a time sensitive network (TSN) profile. In accordance with an exemplary embodiment of the present disclosure, an operation method of a management node in a vehicle network may include receiving a reservation request for transmission of a data stream from a first communication node; identifying a bandwidth required for transmitting the data stream; calculating a path for transmitting the data stream based on the identified bandwidth and time sensitive networking (TSN) profile information; changing configuration modes of one or more relay nodes in the path; and transmitting a response to the reservation request to the first communication node.

The TSN profile information may include information regarding a bandwidth accumulatively used by each relay node in the vehicle network. The information regarding the bandwidth accumulatively used by each relay node may include an accumulated bandwidth ratio indicated as a value obtained by dividing a bandwidth reserved in the each relay node by a maximum bandwidth supportable by the each relay node. Relay nodes having the accumulated bandwidth ratio equal to or less than 1 may be included in the path for transmitting the data stream.

When a relay node having the accumulated bandwidth ratio equal to or greater than 1 exists in the path for transmitting the data stream, the relay node having the accumulated bandwidth ratio equal to or greater than 1 may be instructed to perform link segmentation on the data stream. The TSN profile information may further include an identifier of the data steam, a MAC address of each relay node in the vehicle network, information regarding an interface of each relay node in the vehicle network, and information regarding a bandwidth reserved in each relay node.

The information regarding the interface may include information regarding physical layer units forming an interface, which are included in each relay node. The management node may be configured to execute a configuration mode of each relay node in the vehicle network. The response to the reservation request may include information regarding the path for transmitting the data stream and information regarding the one or more relay nodes existing in the path.

In accordance with another exemplary embodiment of the present disclosure, an operation method of a first communication node forming a vehicle network may include transmitting a reservation request for transmission of a data stream to a management node; receiving a response to the reservation request including information regarding a path for transmitting the data stream and information regarding one or more relay nodes on the path from the management node; and transmitting the data stream based on the response. The information regarding the path may be generated based on information regarding a bandwidth required for transmitting the data stream and time sensitive networking (TSN) profile information.

The TSN profile information may include information regarding a bandwidth accumulatively used by each relay node existing in the vehicle network. The information regarding the bandwidth accumulatively used by each relay node may include an accumulated bandwidth ratio indicated as a value obtained by dividing a bandwidth reserved in the each relay node by a maximum bandwidth supportable by the each relay node. The TSN profile information may further include an identifier of the data steam, a MAC address of each relay node in the vehicle network, information regarding an interface of each relay node in the vehicle network, and information regarding a bandwidth reserved in each relay node.

In accordance with still another exemplary embodiment of the present disclosure, a management node forming a vehicle network may include a processor; and a memory configured to store at least one instruction executable by the processor. When executed by the processor, the at least one instruction causes the processor to: receive a reservation request for transmission of a data stream from a first communication node; identify a bandwidth required for transmitting the data stream; calculate a path for transmitting the data stream based on the identified bandwidth and time sensitive networking (TSN) profile information; change configuration modes of one or more relay nodes existing in the path; and transmit a response to the reservation request to the first communication node.

The TSN profile information may include information regarding a bandwidth accumulatively used by each relay node existing in the vehicle network. The information regarding the bandwidth accumulatively used by each relay node may include an accumulated bandwidth ratio indicated as a value obtained by dividing a bandwidth reserved in the each relay node by a maximum bandwidth supportable by the each relay node. Relay nodes having the accumulated bandwidth ratio equal to or less than 1 may be included in the path for transmitting the data stream.

When a relay node having the accumulated bandwidth ratio equal to or greater than 1 exists in the path for transmitting the data stream, the relay node having the accumulated bandwidth ratio equal to or greater than 1 may be instructed to perform link segmentation on the data stream. The TSN profile information may further include an identifier of the data steam, a MAC address of each relay node existing in the vehicle network, information regarding an interface of each relay node in the vehicle network, and information regarding a bandwidth reserved in each relay node. The response to the reservation request may include information regarding the path for transmitting the data stream and information regarding the one or more relay nodes existing in the path.

According to the exemplary embodiments of the present disclosure, the management node may be configured to analyze the overall network loads through the TSN profile information when a data stream is reserved, and thus, the data stream may be transmitted through a path with less load. In addition, the management node may be configured to manage reservation configurations of relay nodes in the vehicle network in the integrated manner, and thus, the data stream may be efficiently transmitted to a destination node. Further, when the management node configures the reservation of the relay nodes to transmit the data stream, it may be possible to configure the reservations of the relay nodes through a batch command without accessing each relay node individually and configuring the reservation for each relay node.

However, effects of the method and apparatus for transmitting and receiving data streams according to the exemplary embodiments of the present disclosure are not limited to those mentioned above. Other effects not mentioned will be clearly understood by those skilled in the art from the following description.

BRIEF DESCRIPTION OF DRAWINGS

Exemplary embodiments of the present disclosure will become more apparent by describing in detail forms of the present disclosure with reference to the accompanying drawings, in which:

FIG. 10 is a table illustrating TSN profile information according to an exemplary embodiment of the present disclosure;

Figure 1:
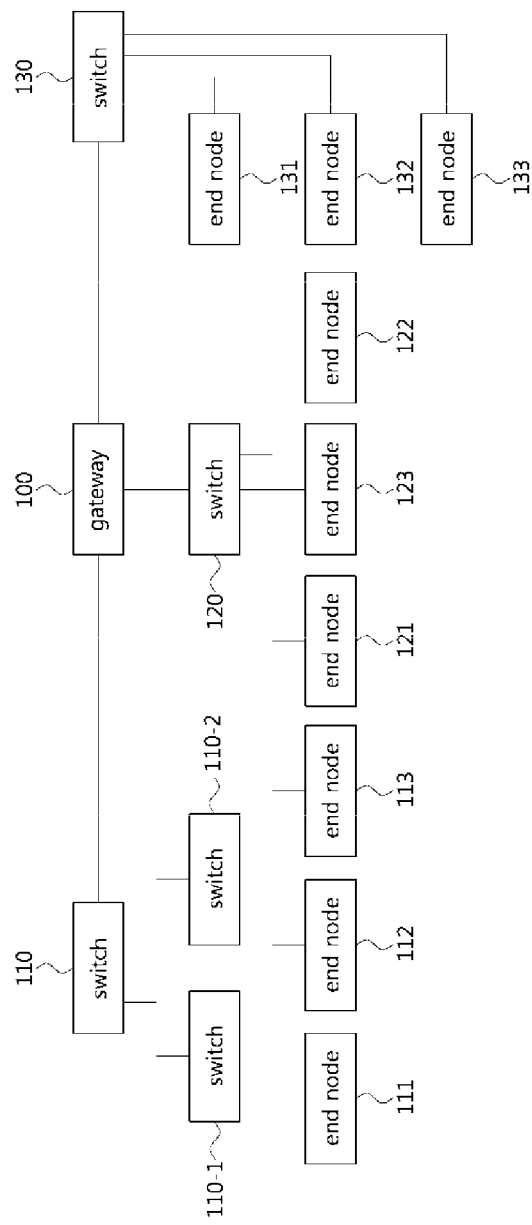
FIG. 1 is a block diagram illustrating a first exemplary embodiment of a vehicle network topology.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, exemplary embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/controller unit/control unit may perform one or more of the processes described further below, and the term controller/controller unit/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/controller unit/ control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first exemplary embodiment of a vehicle network topology. As shown in FIG. 1, a communication node forming a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 124, 125, 131, 132, and 133. Each of the switches 110, 110-1, 110-2, 120, and 130 may interconnect the end nodes 111, 112, 113, 121, 122, 123, 124, 125, 131, 132, and 133, and operate at least one of the end nodes 111, 112, 113, 121, 122, 123, 124, 125, 131, 132, and 133 connected to the switch.

Each of the end nodes 111, 112, 113, 121, 122, 123, 124, 125, 131, 132, and 133 may include an electronic control unit (ECU) configured to operate various types of devices mounted within a vehicle. For example, each of the end nodes 111, 112, 113, 121, 122, 123, 124, 125, 131, 132, and 133 may include an ECU included in an infotainment device (e.g., a display device, a navigation device, and an around view monitoring device).

The communication nodes (i.e., gateways, switches, end nodes, etc.) forming the vehicle network may be connected in a star topology, a bus topology, a ring topology, a tree topology, a mesh topology, or the like. Further, each of the communication nodes forming the vehicle network may support the CAN protocol, the FlexRay protocol, the MOST protocol, the LIN protocol, the Ethernet protocol, or the like. The exemplary embodiments according to the present disclosure may be applied to the network topology described above, the network topology to which the exemplary embodiments according to the present disclosure is applied may be variously configured without being restricted the above-described network topology.

Figure 2:
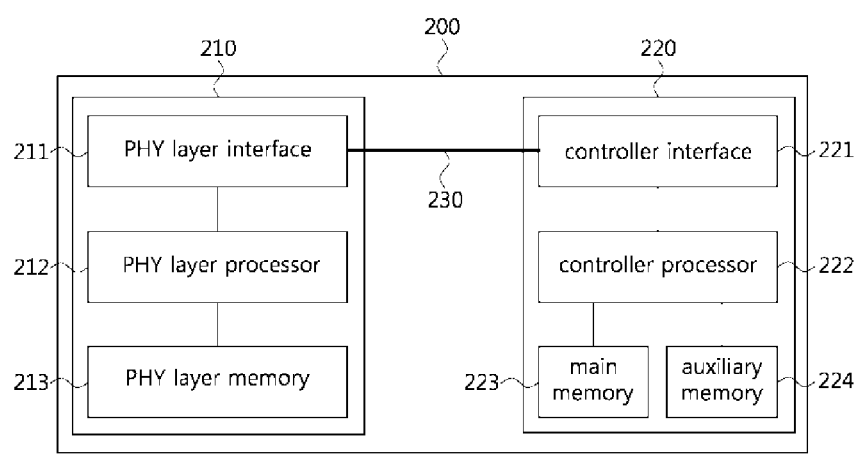
FIG. 2 is a block diagram illustrating a first exemplary embodiment of a communication node belonging to a vehicle network.

FIG. 2 is a block diagram illustrating a first exemplary embodiment of a communication node belonging to a vehicle network. As shown in FIG. 2, a communication node 200 forming a vehicle network may include a physical (PHY) layer unit 210 and a controller unit 220. The communication node 200 may further include a regulator (not shown) configured to supply power. In particular, the controller 220 may be implemented to include a medium access control (MAC) layer. The PHY layer 210 may be configured to receive or transmit signals from or to another communication node. The controller 220 may be configured to operate the PHY layer unit 210 and perform various functions (e.g., an infotainment function, or the like). The PHY layer unit 210 and the controller unit 220 may be implemented as one system on chip (SoC), or alternatively may be implemented as separate chips.

The PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer unit 210 may include a PHY layer interface 211, a PHY layer processor 212, and a PHY layer memory 213. The configuration of the PHY layer unit 210 is not limited thereto, and the PHY layer unit 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface 211 and the PHY layer memory 213. The PHY layer processor 212 may be configured to modulate a signal to be transmitted or demodulate a received signal. The PHY layer processor 212 may be configured to operate the PHY layer memory 213 to input or output a signal. The PHY layer memory 213 may be configured to store the received signal and output the stored signal based on a request from the PHY layer processor 212.

The controller unit 220 may be configured to monitor and operate the PHY layer unit 210 using the MII 230. The controller unit 220 may include a controller interface 221, a controller processor 222, a main memory 223, and an auxiliary memory 224. The controller processor 222 is an electric circuitry which performs various functions described below. The configuration of the controller unit 220 is not limited thereto, and the controller 220 may be configured in various ways.

The controller interface 221 may be configured to receive a signal from the PHY layer unit 210 (e.g., the PHY layer interface 211) or an upper layer (not shown), transmit the received signal to the controller processor 222, and transmit the signal received from the controller processor 222 to the PHY layer unit 210 or the upper layer. The controller processor 222 may further include independent memory control logic or integrated memory control logic for operating the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored.

A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Figure 3:
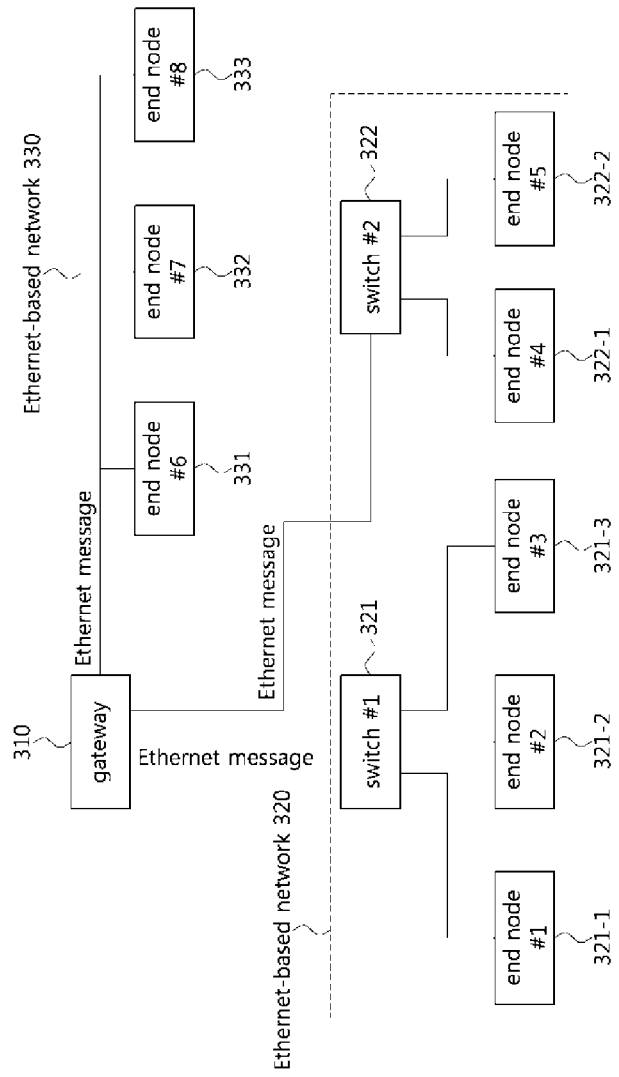
FIG. 3 is a block diagram illustrating a second exemplary embodiment of a vehicle network topology.
Figure 4:
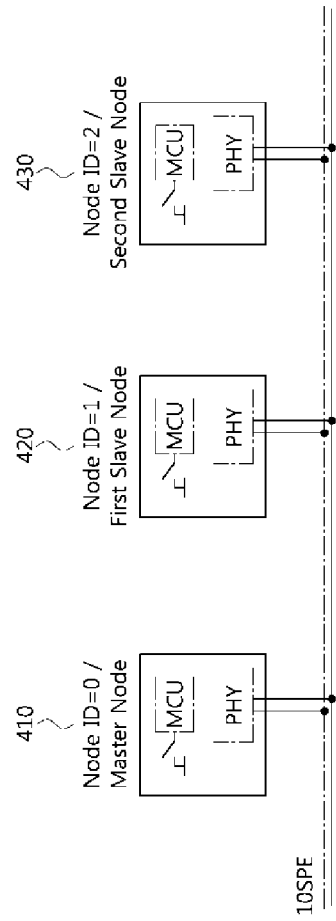
FIG. 4 is a block diagram illustrating an exemplary embodiment of a 10SPE network according to an exemplary embodiment of the present disclosure.

FIG. 3 is a block diagram illustrating a second exemplary embodiment of a vehicle network topology, and FIG. 4 is a block diagram illustrating an exemplary embodiment of a 10SPE network. As shown in FIG. 3, a vehicle network may include a plurality of Ethernet based networks 320 and 330. A gateway 310 belonging to the vehicle network may support Ethernet-based network communication. The Ethernet-based networks may include a switch #1 or a first switch 321, a switch #2 or a second switch 322, an end node #1 or a first end node 321-1, an end node #2 or a second end node 321-2, an end node #3 or a third end node 321-3, an end node #4 or a fourth end node 322-1, an end node #5 or a fifth end node 322-1, an end node #6 or a sixth end node 331, an end node #7 or a seventh end node 332, an end node #8 or an eight end node 333, and the like. The end node #1 321-1, the end node #2 321-2, and the end node #3 323-1 may be connected to the switch #1 321, the end node #4 322-1 and the end node #5 322-2 may be connected to the switch #2 322, and the switch #1 321 and the switch #2 322 may be connected to the gateway 310.

One of the plurality of Ethernet based networks may be a 10 Mbps single pair Ethernet (10SPE) network 330. The end node #6 331, the end node #7 332, and the end node #8 333, which are connected by a 10SPE network scheme, may be connected to the gateway 310 through a bus or a single pair of wires. Messages based on the Ethernet protocol may be referred to as 'Ethernet messages', and the Ethernet messages may be referred to also as 'Ethernet frames', 'Ethernet signals', 'Ethernet packets', or the like. The end nodes 321, 321-1, 321-2, 321-3, 322, 322-1, 322-2, 331, 332, and 333, which are part of the Ethernet-based network, may be configured to communicate using Ethernet messages. Communication between the Ethernet-based networks and the gateway 310 may also be performed using Ethernet messages.

As shown in FIG. 4, the end nodes forming the 10 SPE network may be configured with a master-slave relationship. For example, one end node 410 of the end nodes forming the vehicle network may be a master node, and the remaining nodes 420 and 430 except the master node 410 may be slave nodes. The master node 410 and slave nodes 420 and 430 may operate in a sleep state, and when a local wake-up signal or a remote wake-up signal is received, an operation state of each of the master node 410 and the slave nodes 420 and 430 may transition from the sleep state to a wake-up state.

The master node 410 and the slave nodes 420 and 430 forming the 10 SPE network may refer to electronic control units (ECUs) configured to operate various devices included in the vehicle. Each of the end nodes forming the vehicle network may support the Ethernet protocol. The master node 410 and slave nodes 420 and 430 may be connected in a bus topology. The master node 410 and the slave nodes 420 and 430 may be connected in a power over data lines (PoDL) scheme through a pair of wires. The pair of wires may be wires for supply power to the end node or transferring data packets between the end nodes.

The master node 410 among the end nodes forming the 10 SPE network may be configured to supply a signal and power to wake up the other slave nodes 420 and 430 through a pair of wires. Then, the master node 410 may be configured to communicate with the slave nodes 420 and 430 through a pair of wires. The slave nodes 420 and 430 may be configured to receive the signal from the master node 410 through a pair of wires, and transmit and receive data packets with other nodes through a pair of wires.

When a plurality of end nodes connected to the 10SPE network desire to simultaneously transmit data packets to other end nodes, collisions between different data packets may occur in the PHY layer. A plurality of end nodes connected to the 10SPE network may use a PHY layer collision avoidance (PLCA) function to avoid collision in the PHY layer. In other words, the PLCA function may be a function of sequentially granting a transmission opportunity for transmitting a data packet to a plurality of end nodes connected to the 10SPE network.

Figure 5:
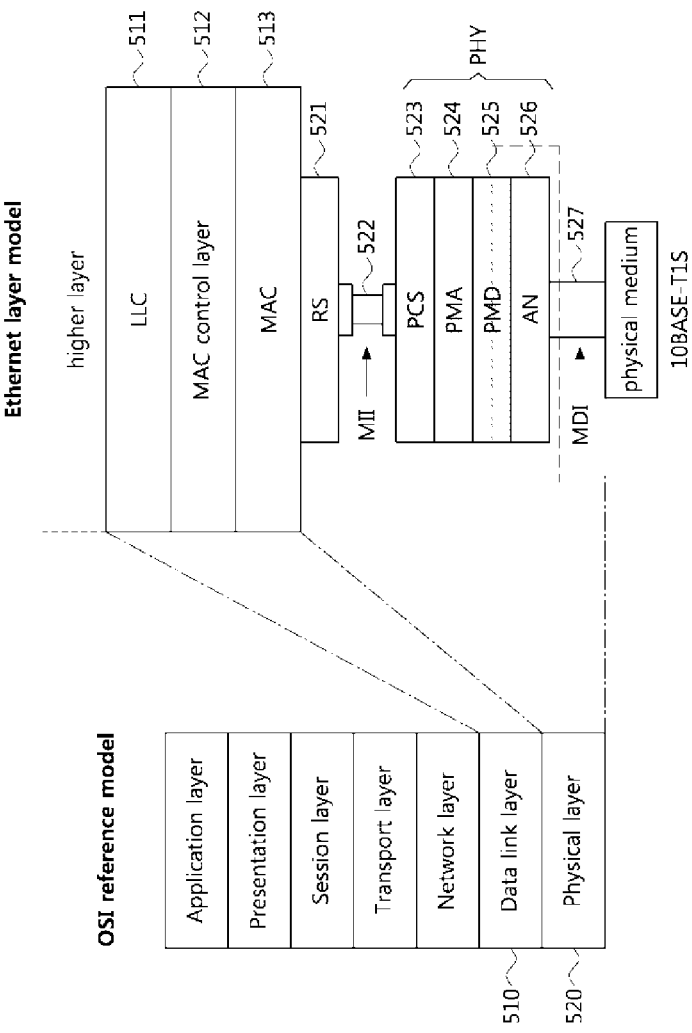
FIG. 5 is a conceptual diagram illustrating an Ethernet layer model according to an exemplary embodiment of the present disclosure.

FIG. 5 is a conceptual diagram illustrating an Ethernet layer model. As shown in FIG. 5, an Ethernet layer model may include a MAC layer and a PHY layer. The MAC layer of the Ethernet layer model may correspond to a data link layer 510 of the open systems interconnection (OSI) reference model, and may include a logical link control (LLC) or other MAC client sublayer 511, a MAC control sublayer 512, and a MAC sublayer 513.

The MAC layer of the Ethernet layer model may be connected to the PHY layer through a reconciliation sublayer (RS) 521 and an MII sublayer 522. The RS 521 and the MII sublayer 522 of the Ethernet layer model may correspond to a PHY layer 520 of the OSI reference model. The RS 521 may be configured to adjust logical signal mapping between the MAC sublayer 513 and a PCS 523 to be described later. The RS 521 may be a sublayer that supports the PCLA function between the MAC layer and the PHY layer connected via the MII sublayer 522. The RS 521 may be configured to adjust mapping of signals between the MAC sublayer and the PCS 523 during a predetermined time slot to prevent collision in the PHY layer due to transmission of frames.

The PHY layer of the Ethernet layer model may correspond to a PHY layer 520 of the OSI reference model, and may include a physical coding sublayer (PCS) 523, a physical media attachment (PMA) sublayer 524, and a physical medium dependent (PMD) sublayer 525, and an auto-negotiation (AN) sublayer 526. The PCS 523 may be configured to obtain data from the MAC layer, and perform line coding on the data based on a protocol of the network (e.g., a transmission speed, etc.). The PCS 523 may be configured to transfer the data generated as a result of the line encoding to the PMA sublayer 524.

The PMA sublayer 524 may be configured to obtain the data generated as a result of the line encoding from the PCS 523, and convert the obtained data into a physical signal. The PMA sublayer 524 may be configured to transfer the data converted into the physical signal to the PMD sublayer 525. The PMD sublayer 525 may be configured to obtain the data converted into the physical signal from the PMA sublayer 524, and convert the obtained physical signal to be suitable for a physical medium connected to the PHY layer.

The AN sublayer 526 may be a sublayer that configures an optimal transmission scheme between end nodes transmitting signals among a plurality of transmission schemes. The AN sublayer 526 may be configured to determine one signal transmission scheme by performing negotiation with other end nodes based on a plurality of signal transmission schemes. In addition, the AN sublayer 526 may be configured to determine master-slave relationship of the plurality of end nodes. For example, when receiving a signal from another end node, the AN sublayer 526 may be configured to determine whether the end node transmitting the signal is a master node or a slave node.

The PHY layer of the Ethernet layer model may be connected to a physical medium through a medium dependent interface (MDI) 527. The MDI 527 may be configured to receive the physical signal from the PMD sublayer 525 and transmit the signal through the physical medium. The MDI 527 of the Ethernet layer model may correspond to the PHY layer 520 of the OSI reference model.

Hereinafter, a method performed at an end node belonging to a vehicle network and a method performed at a corresponding counterpart end node will be described. Even when a method (e.g., transmission or reception of a signal) to be performed at a first end node is described, a corresponding second end node may be configured to perform a method (e.g., reception or transmission of the signal) that corresponds to the method performed at the first end node. In other words, when an operation of the first end node is described, the corresponding second end node may be configured to perform an operation that corresponds to the operation of the first end node. Conversely, when an operation of the second end node is described, the corresponding first end node may be configured to perform an operation that corresponds to the operation of the second end node.

Figure 6:
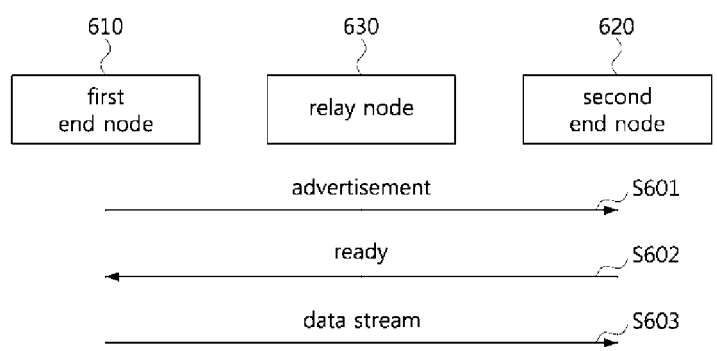
FIG. 6 is a conceptual diagram illustrating a first exemplary embodiment in which a data stream is reserved and transmitted in a vehicle network.

In particular, each of a plurality of end nodes may be configured to perform the following operations through at least one instruction stored in the memory. FIG. 6 is a conceptual diagram illustrating a first exemplary embodiment in which a data stream is reserved and transmitted in a vehicle network. As shown in FIG. 6, a first end node 610 may be configured to transmit information regarding a data stream to be transmitted in a broadcast scheme (S601). The first end node 610 may be configured to transmit the information regarding the data stream through one or more relay nodes (e.g., switch nodes) in the vehicle network. This step may be defined as a 'talk advertisement procedure'.

A second end node 620 in the vehicle network may be configured to receive the information regarding the data stream from the first end node 610 (S601). The second end node 620 may be configured to perform reservation for the data stream based on a path through which the information regarding the data stream is transmitted. In addition, the second end node 620 may be configured to inform the first end node 610 of information related to the reservation for the data stream (S602). This step may be defined as a 'listener ready procedure'. The steps S601 and S620 may be performed based on a stream reservation protocol (SRP). Thereafter, the first end node 610 may be configured to transmit the data stream to the second end node 620 (S603).

Figure 7:
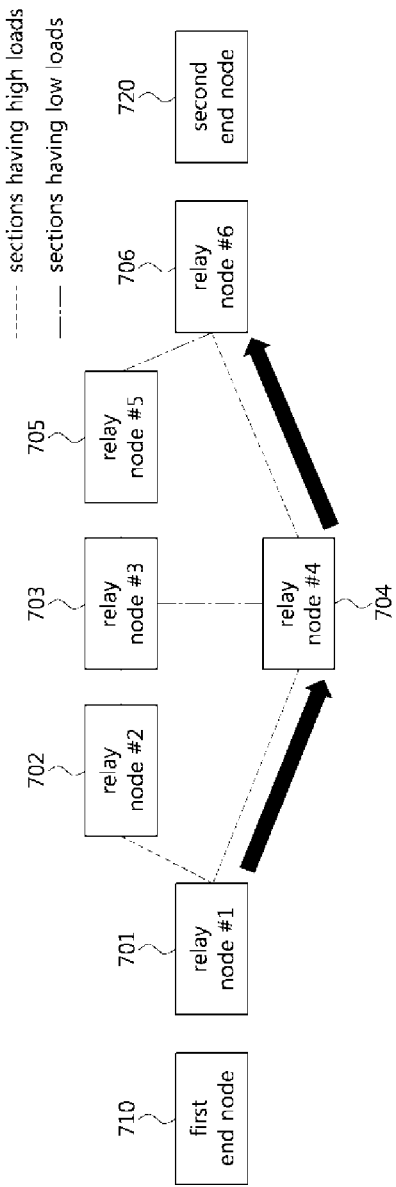
FIG. 7 is a conceptual diagram illustrating a data stream reservation method in the vehicle network according to FIG. 6 according to an exemplary embodiment of the present disclosure.

FIG. 7 is a conceptual diagram illustrating a data stream reservation method in the vehicle network according to FIG. 6. As shown in FIG. 7, a vehicle network may include one or more relay nodes 701, 702, 703, 704, 705 and 706. A first end node 710 may be configured to transmit information regarding a data stream to be transmitted through the relay nodes.

A second end node 720 may be configured to receive information regarding the data stream to be transmitted from the first end node 710. In an exemplary embodiment, the second end node 720 may be configured to receive the information regarding the data stream through the shortest path between the first end node 710 and the second end node 720 (e.g., a path of (first end node 710→relay node 701→relay node 704→relay node 706→second end node 720). The second end node 720 may be configured to generate information regarding reservation for the data stream based on the path through which the information regarding the data stream is received, and inform the first end node 710 of the information regarding the reservation for the data stream. Thereafter, the first end node 710 may be configured to transmit the data stream through the shortest path between the first end node 710 and the second end node 720.

Meanwhile, each relay node in the vehicle network may be configured to identify information regarding a bandwidth which each relay node can accommodate. In particular, each relay node may not share the information regarding the bandwidth which it is capable of accommodating with other relay nodes or end nodes. Accordingly, when a failure occurs while the first end node 710 performs the reservation for transmitting the data stream, the first end node 710 and the second end node 720 may be configured to receive only a report regarding the failure, and may not know which relay node has a problem or failure. In particular, the first end node 710 may have a problem of continuously attempting to make the reservation until the reservation becomes possible.

In addition, when the first end node 710 simply transmits the data stream through the shortest path without consideration on the loads of sections forming the path, a delay of the transmission of the data stream may occur. When the first end node 710 performs the reservation for the data stream, if link speeds for the respective communication sections are not considered, a problem where the reservation cannot be made may occur.

For example, when a section supporting a transmission speed of 10 Mbps (hereinafter referred to as a '10 Mbps bandwidth') and a section that supports a transmission speed of 1 Gbps (hereinafter referred to as a '1 Gbps bandwidth') coexist in the vehicle network, if the first end node 710 transmits a data stream requiring a transmission speed of 30 Mbps (hereinafter referred to as a '30 Mbps bandwidth'), the reservation itself may not be possible in the section supporting the 10 Mbps bandwidth. Further, when link segmentation is performed in a specific section, if there is no relay node in the corresponding section, matching between transmission and reception through reservation on a port basis may be difficult.

Figure 8:
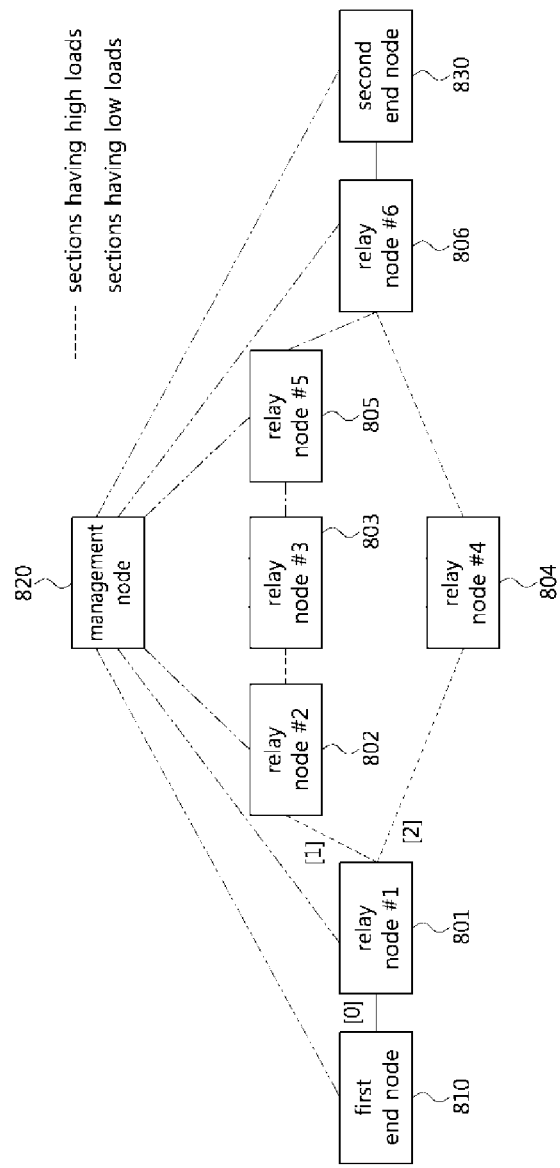
FIG. 8 is a conceptual diagram illustrating a second exemplary embodiment in which a data stream is reserved and transmitted in a vehicle network.

FIG. 8 is a conceptual diagram illustrating a second exemplary embodiment in which a data stream is reserved and transmitted in a vehicle network. As shown in FIG. 8, a vehicle network may include a first end node 810, one or more relay nodes 801, 802, 803, 804, 805, and 806, a management node 820, and a second end node 830 which is a destination node. The vehicle network according to FIG. 8 may have a centralized network configuration (CNC) structure, and all the nodes, including the first end node 810, relay nodes 801, 802, 803, 804, 805, and 806, and the second end 830, may be connected to the management node 820.

The management node 820 may be configured to integrally manage and control reservation and transmission of a data stream using time sensitive networking (TSN) profile information. For example, the management node 820 may be configured to identify how much bandwidth is used for each specific section in the entire network topology, and which section has a low load through the TSN profile information. Accordingly, the management node 820 may be configured to perform resource reservation, reservation release, and the like by utilizing the TSN profile information.

The management node 820 may be configured to utilize the TSN profile information for the stream reservation protocol (SRP), and based thereon, perform reservation of a data stream between the first end node 810 and the second end node 830. In particular, the management node 820 may be configured to make the reservation with a path where the loads are distributed. In other words, the path may not be the shortest path between the first end node 810 and the second end node 820.

The management node 820 may be configured to change configurations of all the nodes existing in the vehicle network. Accordingly, an indicator 'externalControl' of each of the relay nodes 801, 802, 803, 804, 805, and 806 and the end nodes 810 and 820 may be set to TRUE. Particularly, the indicator 'externalControl' may be an indicator for allowing the relay nodes 801, 802, 803, 804, 805, and 806 and the end nodes 810 and 820 to change internal configurations by receiving requests of an external management entity such as the management node 820. The management node 820 may exist in form of a relay node or an end node based on implementation thereof.

Figure 9:
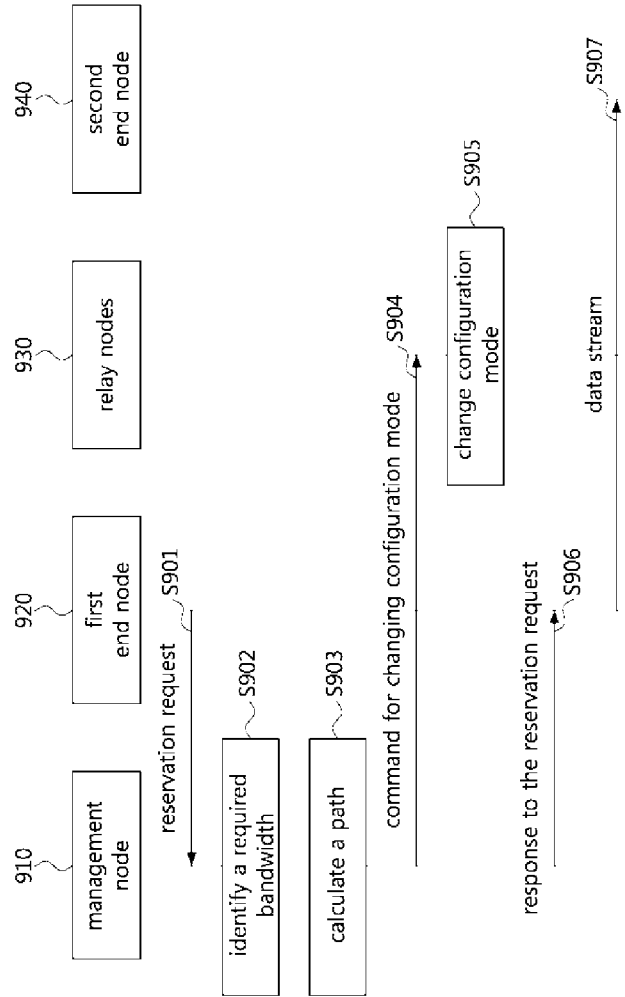
FIG. 9 is a sequence chart illustrating an operation method of a communication node in the vehicle network according to FIG. 8 according to an exemplary embodiment of the present disclosure.

FIG. 9 is a sequence chart illustrating an operation method of a communication node in the vehicle network according to FIG. 8. As shown in FIG. 9, a first end node 920 may be configured to transmit to a management node 910 a reservation request for transmission of a data stream, and the management node 910 may be configured to receive the reservation request from the first end node 920 (S901).

The management node 910 may be configured to receive the reservation request from the first end node 920, and identify a bandwidth required for transmitting the data stream (S902). Additionally, the management node 910 may be configured to calculate a path for transmitting the data stream by using the information on the bandwidth required for transmitting the data stream and TSN profile information (S903).

FIG. 10 is a table illustrating TSN profile information. As shown in FIG. 10, TSN profile information may include a data stream identifier (ID) 1001, a MAC address 1002 of each relay node in the vehicle network, interface information

1003 of each relay node in the vehicle network, information 1004 regarding a reserved bandwidth in each interface, and information 1005 regarding a bandwidth that each relay node in the vehicle network uses accumulatively.

The data stream ID 1001 may be an identifier configured to identify a path through which the data stream is transmitted. For example, a data stream having a data stream ID of '1' and a data stream having a data stream ID of '3' may be data streams having different transmission paths. The MAC address 1002 of the relay node may be an address that a network device (i.e., relay node) in the Ethernet layer. The interface information 1003 of the relay node may refer to information regarding an interface for each section reserved through the SRP. Specifically, the interface information 1003 may include identifiers of PHY layer units included in each relay node. The relay node may include one or more PHY layer units, and the interface information 1003 may include identifiers of PHY layer units through which the data stream is transmitted.

Referring back to FIG. 8, for example, when the MAC address of the relay node 801 is '1' and the interface information indicates 'PHY[0] →PHY[1]', the data stream may be forwarded to the relay node 802. On the other hand, when the MAC address of the relay node 801 is '1' and the interface information indicates 'PHY[0] →PHY[2]', the data stream may be forwarded to the relay node 804.

Referring back to FIG. 10, information 1004 regarding the reserved bandwidth in the interface may refer to a bandwidth reserved in the corresponding interface to transmit the data stream. Specifically, the bandwidth for transmitting the data stream may be reserved for an output port of the relay node. Therefore, the management node 910 may be configured to identify that a bandwidth is reserved for each section. In particular, the same bandwidth may be reserved for each interface, or a different bandwidth may be reserved for each interface.

The information 1005 regarding the accumulated bandwidth ratio that the relay node may include a value obtained by dividing the reserved bandwidth in the relay node by a maximum bandwidth supported by the relay node. For example, when the reserved bandwidth in the interface of the corresponding relay node is 30 Mbps, and the maximum bandwidth supported by the relay node is 100 Mbps, the accumulated bandwidth ratio may be 30 Mbps/100 Mbps=0.3 (30%). When the accumulated bandwidth ratio exceeds 1 (i.e., 100%), it indicates that the bandwidth that the corresponding relay node may accommodate has been exceeded. Referring back to FIG. 9, the management node 910 may be configured to calculate a path for transmitting the data stream using the information regarding the bandwidth required for transmitting the data stream and the TSN profile information described with reference to FIG. 10 (S903).

Figure 11:
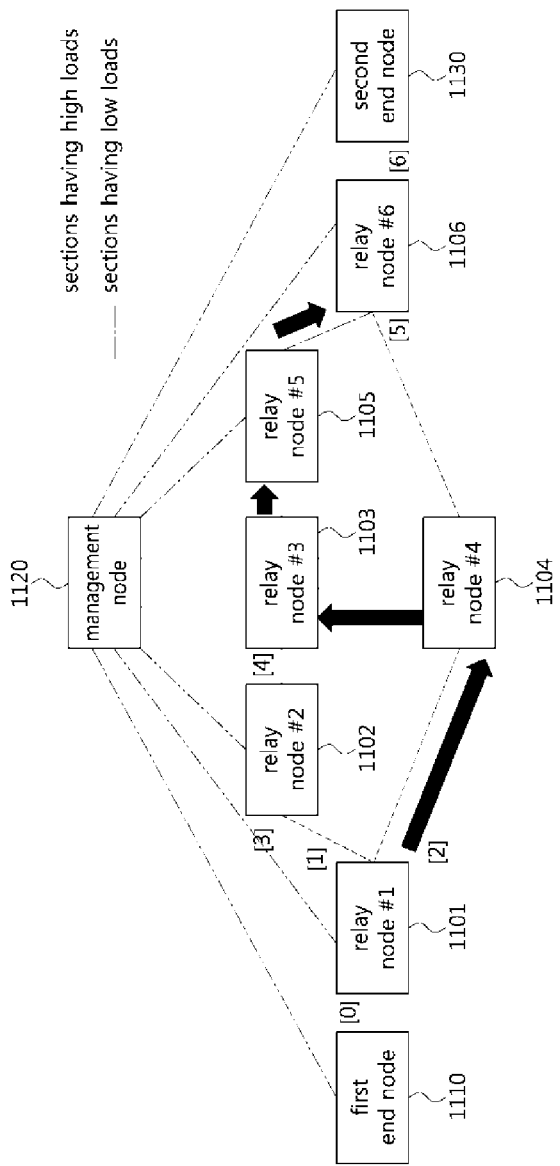
FIG. 11 is a conceptual diagram illustrating a data stream reservation method in the vehicle network according to FIG. 8 according to an exemplary embodiment of the present disclosure.

FIG. 11 is a conceptual diagram illustrating a data stream reservation method in the vehicle network according to FIG. 8. Referring to FIG. 11, the management node 1120 may be configured to calculate a path by reflecting the information 1005 regarding the accumulated bandwidth ratio included in TSN profile information. In an exemplary embodiment, the management node 1120 may be configured to allow relay nodes having an accumulated bandwidth ratio equal to or less than 1 to be preferentially included in the path.

The management node 1120 may be configured to identify the accumulated bandwidth ratios of all the nodes in the vehicle network, and reflect the information to configure a path including sections with small loads. For example, the management node 1120 may be configured to configure a path of (first end node 1110→relay node 1101→relay node 1104→relay node 1103→relay node 1105→relay node 1106→second end node 1130). The path may be not the shortest path but a path in which the loads are minimized. In other words, the management node 1120 may be configured to generate a path that prevents a burst or congestion. As described above, unlike the vehicle network according to FIG. 7, the management node 1120 may be configured to calculate an optimal path for transmitting the data stream without the talk advertisement procedure and the listener ready procedure in the vehicle network according to FIG. 8.

Figures 12, 13:
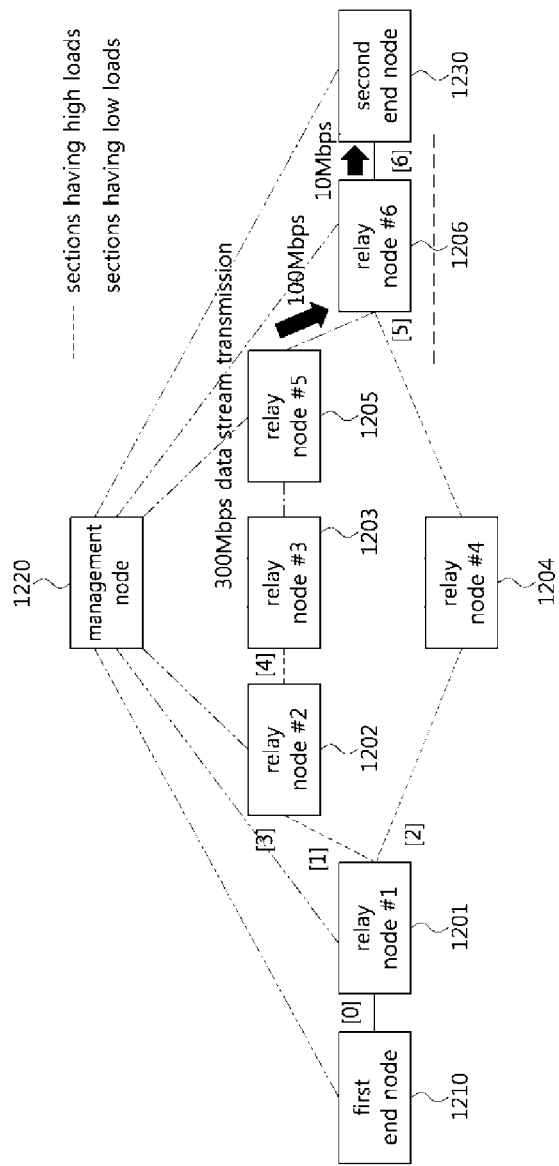
FIG. 12 is a conceptual diagram illustrating a situation where a bandwidth required for transmitting a data stream and a bandwidth that a relay node may accommodate are different in the vehicle network of FIG. 8 according to an exemplary embodiment of the present disclosure.
FIG. 13 is a table illustrating TSN profile information of a relay node 1206 shown in FIG. 12 according to an exemplary embodiment of the present disclosure.

Meanwhile, a case where a link bandwidth is changed in the corresponding path may occur. FIG. 12 is a conceptual diagram illustrating a situation where a bandwidth required for transmitting a data stream and a bandwidth that a relay node may accommodate are different in the vehicle network of FIG. 8, and FIG. 13 is a table illustrating TSN profile information of a relay node 1206 shown in FIG. 12. As shown in FIGS. 12 and 13, a relay node (e.g., relay node 1206) having an accumulated bandwidth ratio greater than 1 may exist in a path for transmitting a data stream. For example, when a 30 Mbps bandwidth is required to be allocated for transmission of the data stream for updating software of the vehicle, it may be necessary to reserve and transmit the data stream to guarantee a required QoS.

In FIG. 12, a 100 Mbps bandwidth may be allocated to an input port of the relay node 1206, but a 10 Mbps bandwidth may be allocated to an output port of the relay node 1206, which is connected to the second end node 1230, and thus, the bandwidth that the relay node 1206 may accommodate may be exceeded. In other words, the accumulated bandwidth ratio included in the TSN profile information of the relay node 1206 may be (30 Mbps/10 Mbps=3) (i.e., 300%). Even when the accumulated bandwidth ratio included in the TSN profile information exceeds 1 (i.e., 100%), the management node 1220 may proceed with the reservation without canceling the reservation. Thereafter, the management node 1220 may allow transmission of the data stream in the corresponding section. Specifically, the management node 1220 may be configured to instruct the relay node to perform link segmentation on the data stream.

Figures 14, 15:
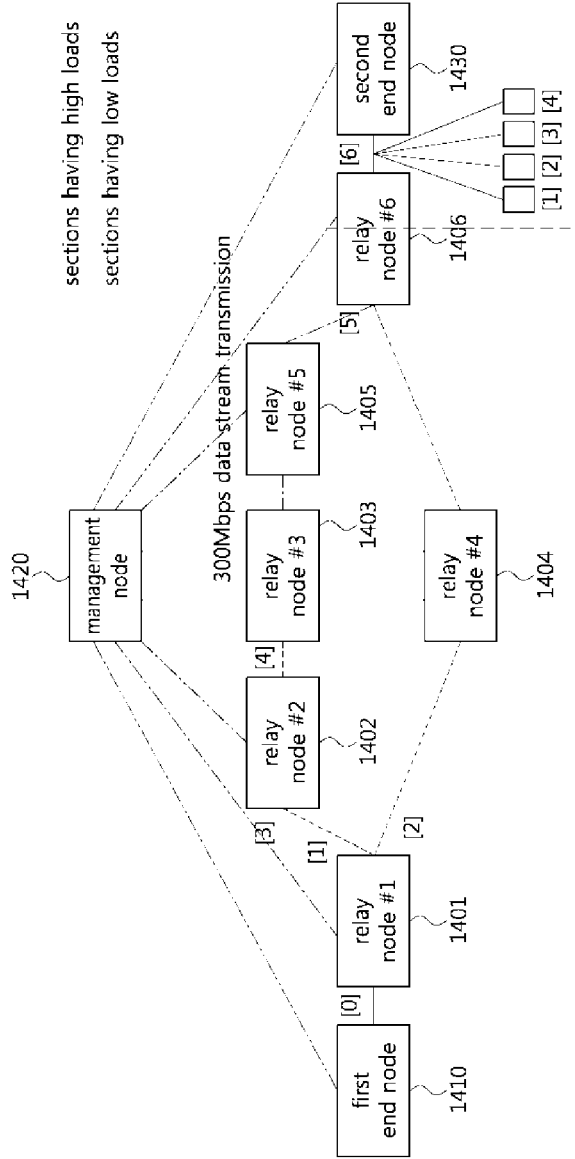
FIG. 14 is a conceptual diagram illustrating a procedure in which a link segmentation is performed in the vehicle network of FIG. 8 according to an exemplary embodiment of the present disclosure.
FIG. 15 is a table illustrating TSN profile information of a relay node 1406 shown in FIG. 14 according to an exemplary embodiment of the present disclosure.

FIG. 14 is a conceptual diagram illustrating a procedure in which a link segmentation is performed in the vehicle network of FIG. 8, and FIG. 15 is a table illustrating TSN profile information of a relay node 1406 shown in FIG. 14. Referring to FIGS. 14 and 15, the management node 1420 may be configured to perform reservation of a data stream in a section to which link segmentation is applied. Specifically, the management node 1420 may be configured to perform reservation for the data stream in the section to which link segmentation is applied based on the interface information included in the TSN profile information.

For example, assuming that the link segmentation is performed in a time division multiple access (TDMA) scheme, the management node 1420 may be configured to operate the data stream having a stream ID of 1 to be output to an output port PHY[6] so that the data stream is forwarder to an ECU[3] (i.e., the third order in the TDMA scheme). In particular, the management node 1420 may indicate 'PHY [6][3]' in the interface information 1503 included in the TSN profile information so that matching to the corresponding destination node is performed. In other words, the management node 1420 may be configured to utilize the TSN profile information to perform target ECU matching and reservation of the data stream even in the link segmentation environment.

Figure 16:
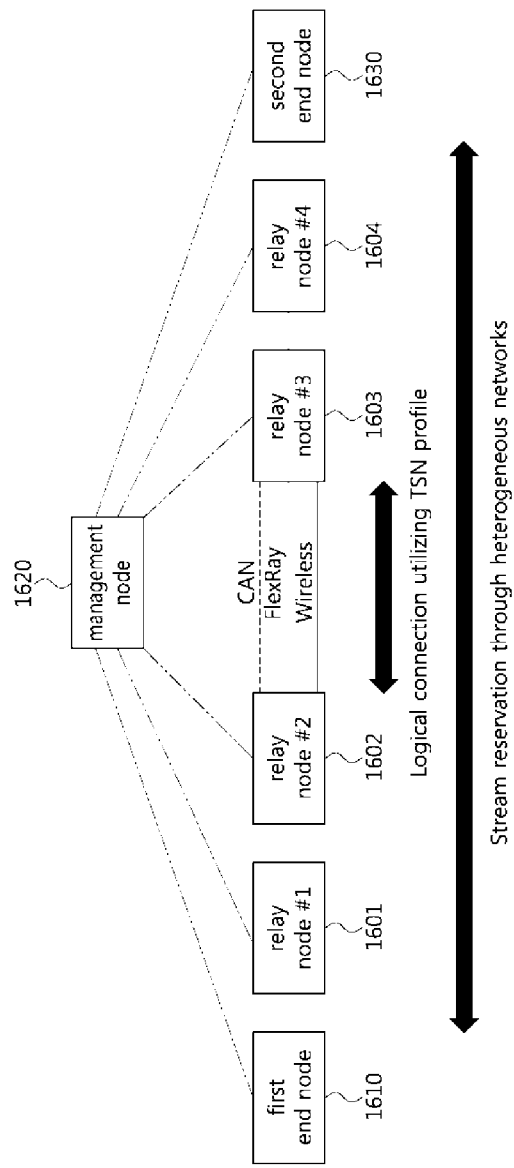
FIG. 16 is a conceptual diagram illustrating a system in which heterogeneous networks are configured in the vehicle network according to FIG. 8 according to an exemplary embodiment of the present disclosure.

FIG. 16 is a conceptual diagram illustrating a system in which heterogeneous networks are configured in the vehicle network according to FIG. 8. As shown in FIG. 16, a heterogeneous network such as a CAN network, a FlexRay network, or a wireless network may exist between Ethernet networks in a vehicle network. In particular, the management node 1620 may be configured to utilize TSN profile information to perform logical connections between the networks including the heterogeneous network by using a scheme such as tunneling.

Referring back to FIG. 9, the management node 910 may be configured to determine the reserved path (i.e., the calculated path) as a path having a sufficient bandwidth, and instruct the relay nodes in the corresponding path to change their configuration modes (S904). The TSN profile information may include externalControl information of all the nodes in the vehicle network.

Therefore, the management node 910 may be configured to perform the reservation of the data stream through one command (or indicator) without accessing all relay nodes whenever the reservation of the data stream is performed. In particular, a problem in which a reservation is canceled due to reservation of another data stream while performing the reservation of the data stream may be resolved. Meanwhile, the management node 910 may be configured to periodically update the TSN profile information. For example, the management node 910 may be configured to update the TSN profile information every TSN time synchronization.

The management node 910 may be configured to determine the reserved path (i.e., the calculated path) as a path having a sufficient bandwidth, and instruct the relay nodes in the corresponding path to change their configuration modes (S904). The relay nodes that receive a command for changing the configuration modes from the management node 910 may be configured to change their configuration modes to a reservation mode (S905). Thereafter, the management node 910 may be configured to transmit a response to the reservation request of the step S901 to the first end node 920, and the first end node 920 may be configured to receive the response to the reservation request of the step S910 (S906). The response to the reservation request may include information regarding the path for transmitting the data stream and information regarding at least one relay node in the path. The first end node 920 may be configured to transmit the data stream to the second end node 940 based on the response to the reservation request (S907).

The methods according to exemplary embodiments of the present disclosure may be implemented as program instructions executable by a variety of computers and recorded on a computer readable medium. The non-transitory computer readable medium may include a program instruction, a data file, a data structure, or a combination thereof. The program instructions recorded on the non-transitory computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the operation of the present disclosure, and vice versa.

While the exemplary embodiments of the present disclosure and their advantages have been described in detail above, it should be understood that various changes, substitutions and alterations may be made herein without departing from the scope of the disclosure.

What is claimed is:

1. An operation method of a management node in a vehicle network, comprising:
  receiving, by a processor, a reservation request for transmission of a data stream from a first communication node;
  identifying, by the processor, a bandwidth required for transmitting the data stream;
  calculating, by the processor, a path for transmitting the data stream based on the identified bandwidth and time sensitive networking (TSN) profile information;
  changing, by the processor, configuration modes of one or more relay nodes in the path; and
  transmitting, by the processor, a response to the reservation request to the first communication node,
  wherein the TSN profile information includes an identifier of the data steam, a MAC address of each relay node in the vehicle network, information regarding an interface of each relay node in the vehicle network, and information regarding a bandwidth reserved in each relay node.

2. The operation method according to claim 1, wherein the TSN profile information further includes information regarding a bandwidth accumulatively used by each relay node in the vehicle network.

3. The operation method according to claim 2, wherein the information regarding the bandwidth accumulatively used by each relay node includes an accumulated bandwidth ratio indicated as a value obtained by dividing the bandwidth reserved in the each relay node by a maximum bandwidth supportable by the each relay node.

4. The operation method according to claim 3, wherein relay nodes having the accumulated bandwidth ratio equal to or less than 1 are included in the path for transmitting the data stream.

5. The operation method according to claim 3, wherein, when a relay node having the accumulated bandwidth ratio equal to or greater than 1 exists in the path for transmitting the data stream, the relay node having the accumulated bandwidth ratio equal to or greater than 1 is instructed to perform link segmentation on the data stream.

6. The operation method according to claim 1, wherein the information regarding the interface includes information regarding physical layer units forming an interface, which are included in each relay node.

7. The operation method according to claim 1, wherein the management node is configured to execute a configuration mode of each relay node in the vehicle network.

8. The operation method according to claim 1, wherein the response to the reservation request includes information regarding the path for transmitting the data stream and information regarding the one or more relay nodes in the path.

9. An operation method of a first communication node forming a vehicle network, comprising:
  transmitting, by a processor, a reservation request for transmission of a data stream to a management node;
  receiving, by the processor, a response to the reservation request including information regarding a path for transmitting the data stream and information regarding one or more relay nodes on the path from the management node; and transmitting, by the processor, the data stream based on the response, wherein the information regarding the path is generated based on information regarding a bandwidth required for transmitting the data stream and time sensitive networking (TSN) profile information, and wherein the TSN profile information includes an identifier of the data steam, a MAC address of each relay node in the vehicle network, information regarding an interface of each relay node in the vehicle network, and information regarding a bandwidth reserved in each relay node.

10. The operation method according to claim 9, wherein the TSN profile information further includes information regarding a bandwidth accumulatively used by each relay node in the vehicle network.

11. The operation method according to claim 10, wherein the information regarding the bandwidth accumulatively used by each relay node includes an accumulated bandwidth ratio indicated as a value obtained by dividing the bandwidth reserved in the each relay node by a maximum bandwidth supportable by the each relay node.

12. A management node constituting a vehicle network, comprising:

a processor; and a memory configured to store at least one instruction executable by the processor, wherein when executed by the processor, the at least one instruction causes the processor to:

receive a reservation request for transmission of a data stream from a first communication node;

identify a bandwidth required for transmitting the data stream;

calculate a path for transmitting the data stream based on the identified bandwidth and time sensitive networking (TSN) profile information;

change configuration modes of one or more relay nodes in the path; and transmit a response to the reservation request to the first communication node, wherein the TSN profile information includes an identifier of the data steam, a MAC address of each relay node in the vehicle network, information regarding an interface of each relay node in the vehicle network, and information regarding a bandwidth reserved in each relay node.

13. The management node according to claim 12, wherein the TSN profile information further includes information regarding a bandwidth accumulatively used by each relay node in the vehicle network.

14. The management node according to claim 13, wherein the information regarding the bandwidth accumulatively used by each relay node includes an accumulated bandwidth ratio indicated as a value obtained by dividing the bandwidth reserved in the each relay node by a maximum bandwidth supportable by the each relay node.

15. The management node according to claim 14, wherein relay nodes having the accumulated bandwidth ratio equal to or less than 1 are included in the path for transmitting the data stream.

16. The management node according to claim 14, wherein, when a relay node having the accumulated bandwidth ratio equal to or greater than 1 exists in the path for transmitting the data stream, the relay node having the accumulated bandwidth ratio equal to or greater than 1 is instructed to perform link segmentation on the data stream.

17. The management node according to claim 12, wherein the response to the reservation request includes information regarding the path for transmitting the data stream and information regarding the one or more relay nodes in the path.

* * * * *